US011353609B2

(12) United States Patent
Liu et al.

(10) Patent No.: US 11,353,609 B2
(45) Date of Patent: Jun. 7, 2022

(54) IDENTIFYING GEOLOGIC FEATURES IN A SUBTERRANEAN FORMATION USING ANGLE DOMAIN GATHERS SAMPLED IN A SPIRAL COORDINATE SPACE

(71) Applicant: Saudi Arabian Oil Company, Dhahran (SA)

(72) Inventors: Hongwei Liu, Dhahran (SA); Fuhao Qin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/723,590

(22) Filed: Dec. 20, 2019

(65) Prior Publication Data
US 2021/0190982 A1    Jun. 24, 2021

(51) Int. Cl.
*G01V 1/30* (2006.01)
*G01V 1/34* (2006.01)

(52) U.S. Cl.
CPC .............. *G01V 1/306* (2013.01); *G01V 1/308* (2013.01); *G01V 1/345* (2013.01)

(58) Field of Classification Search
CPC ........ G01V 1/306; G01V 1/308; G01V 1/345; G01V 2210/1234; G01V 2210/48; G01V 2210/51–52; G01V 2210/632; G01V 2210/646
See application file for complete search history.

(56) References Cited

U.S. PATENT DOCUMENTS

| 8,120,991 | B2 | 2/2012 | Koren et al. |
| 8,209,126 | B2 | 6/2012 | Berkovitch |
| 8,315,124 | B2 | 11/2012 | Zhu |
| 8,531,914 | B2 | 9/2013 | Delpart-Jannaud |

(Continued)

FOREIGN PATENT DOCUMENTS

| EP | 1508058 | 2/2005 |
| GB | 2525072 | 10/2015 |

(Continued)

OTHER PUBLICATIONS

Koren et al., Full-Azimuth Angle Domain Imaging, 2008 SEG Las Vegas Annual Meeting, pp. 2221-2225 (Year: 2008).*

(Continued)

*Primary Examiner* — Toan M Le
(74) *Attorney, Agent, or Firm* — Fish & Richardson P.C.

(57) ABSTRACT

Systems and methods for seismic imaging of a subterranean geological formation include receiving parameter data representing one or more parameters of a seismic survey, the seismic data specifying an incident angle and an azimuth angle for each trace of the seismic survey; determining a relationship between the incident angle and the azimuth angle for each trace and a location in a spiral coordinate system, and generating a weighting function for applying a weight value to each trace seismic data based on the incident angle and the azimuth angle associated with each trace; and determining a residual moveout value of the seismic data for each location in the spiral coordinate system by applying the (Continued)

weighting function to each; and generating a seismic image representing the residual moveout value of the seismic data for each location in the spiral coordinate system.

20 Claims, 11 Drawing Sheets

(56) References Cited

U.S. PATENT DOCUMENTS

| | | | |
|---|---|---|---|
| 8,760,967 B2 | 6/2014 | Nichols et al. | |
| 8,948,463 B2 | 2/2015 | Landa | |
| 9,395,457 B2 | 7/2016 | Poole | |
| 9,702,999 B2 | 7/2017 | Sun et al. | |
| 10,295,685 B2 | 5/2019 | Zhang et al. | |
| 10,324,205 B2 | 6/2019 | Wang et al. | |
| 2004/0243312 A1 | 12/2004 | Schonewille | |
| 2006/0250892 A1* | 11/2006 | Siliqi | G01V 1/30 367/52 |
| 2010/0212909 A1 | 8/2010 | Baumstein | |
| 2012/0004849 A1 | 1/2012 | Aarre | |
| 2014/0032119 A1 | 1/2014 | Landa | |
| 2014/0200813 A1* | 7/2014 | Montel | G01V 1/303 702/14 |
| 2014/0269185 A1 | 9/2014 | Ferber | |
| 2015/0073715 A1* | 3/2015 | Aarre | G01V 1/345 702/14 |
| 2015/0276956 A1 | 10/2015 | Khalil et al. | |
| 2015/0355355 A1 | 12/2015 | Guan et al. | |
| 2016/0109595 A1 | 4/2016 | Stork | |
| 2016/0327661 A1 | 11/2016 | Mousa | |
| 2017/0192118 A1 | 7/2017 | Du et al. | |
| 2018/0120464 A1 | 5/2018 | Sun et al. | |
| 2018/0143334 A1 | 5/2018 | Hegna et al. | |
| 2018/0143337 A1 | 5/2018 | Koren et al. | |
| 2018/0180755 A1 | 6/2018 | Yan | |
| 2018/0364374 A1 | 12/2018 | Brenders et al. | |
| 2019/0179045 A1 | 6/2019 | Zhang et al. | |
| 2019/0277988 A1 | 9/2019 | Liu et al. | |

FOREIGN PATENT DOCUMENTS

| | | |
|---|---|---|
| GB | 2530126 | 3/2016 |
| WO | WO2008053489 | 5/2008 |
| WO | WO2012051267 | 4/2012 |
| WO | WO2015051267 | 4/2015 |
| WO | 2490584 | 4/2017 |
| WO | WO2018075738 | 4/2018 |
| WO | WO2018187461 | 10/2018 |
| WO | WO2019055565 A | 3/2019 |

OTHER PUBLICATIONS

One Petro Search Results, Dec. 30, 2020, 1 pp. (Year: 2020).*
Vargas et al., Improved Imaging for Fault and Fracture Characterization: Southwest Onshore Abu Dhabi Case Study, Nov. 12-15, 2018, Abu Dhabi International Petroleum Exhibition & Conference, Abu Dhabi, UAE, 10 pp. (Year: 2018).*
One Petro Search Results, May 10, 2021, 10 pp. (Year: 2021).*
GCC Examination Report in GCC Appln. No. GC 2019-36896, dated Sep. 15, 2020, 3 pages.
International Search Report and Written Opinion issued in International Application No. PCT/US2019-014488 dated May 13, 2019, 17 pages.
Mahmoudian et al., "Angle-domain CIG: A review of angle domain common image gathers," CREWES Research Report—vol. 1, dated Jan. 1, 2009, 22 pages.
Shen et al, ""Azimuthal offset-dependeni attributes applied to fracture detection in a carbonate reservoir,"" GEOPHYSICS, vol. 67. No. 2 (Mar.-Apr. 2002): p. 355-364, 10 pages.
Van Veldhuizen, "Integrated approach to 3-D seismic acquisition geometry analysis," Technische Universiteit Delft, Sep. 19, 2006, 192 pages.
Thorbecke et al., "CFP gathers: definition, sythesis and application" Laboratory of Seisnnics and Acoustics, 1996, 2 pages.
Thorbecke et al., "Recursive prestack depth migration using CFP gathers", Geophysics,vol. 71, No. 6, Nov. 2006, 273-283, 11 pages.
PCT International Search Report and Written Opinion in International Application No. PCT/US2020/065585, dated Apr. 13, 2021, 14 pages.
GCC Examination Report in GCC Appln. No. GC 2020-41196, dated Dec. 31, 2021, 5 pages.

* cited by examiner

IDENTIFYING GEOLOGIC FEATURES IN A SUBTERRANEAN FORMATION USING ANGLE DOMAIN GATHERS SAMPLED IN A SPIRAL COORDINATE SPACE

TECHNICAL FIELD

The present disclosure generally relates to an approach for identifying geologic features in a subterranean formation using seismic diffraction imaging.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications including identification of potential petroleum reservoirs. Seismic surveys are conducted by using a controlled seismic source (for example, a seismic vibrator or dynamite) to create seismic waves. The seismic source is typically located at ground surface. Seismic body waves travel into the ground, are reflected by subsurface formations, and return to the surface where they recorded by sensors called geophones. Seismic surface waves travel along the ground surface and diminish as they get further from the surface. Seismic surface waves travel more slowly than seismic body waves. The geologists and geophysicists analyze the time it takes for the seismic body waves to reflect off subsurface formations and return to the surface to map sedimentary facies and other geologic features. Similarly, analysis of the time it takes seismic surface waves to travel from source to sensor can provide information about near surface features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This document describes a data processing system and processes for generating a five dimensional (5D) Angle Domain Common Image Gather (ADCIG) sampled in a spiral coordinate space. In a seismic survey, a seismic source, such as a seismic vibrator or an explosion, generates seismic waves that propagate in the earth. The generated seismic waves include seismic body waves that travel into the ground and seismic surface waves that travel along the ground surface and diminish as they get further from the surface. The seismic body waves are received by a sensor or sensors. Based on the input data, a computer may generate a seismic data output including seismic traces, for example, a seismic two-way response time plot. For performing an image gather, traces of the seismic data are stacked to improve the signal to noise ratio of the traces. This can be done with a moveout correction of the traces based on the configuration of the traces with respect to the receiver. For example, in some systems, a normal moveout (NMO) correction can be performed, in which the difference between vertical reflection time and the slant reflection time for a given source-sensor pair are corrected for stacking the traces. In this example, the stack trace is generated by summing the traces of the CMP gather and dividing the resulting amplitudes by the number of traces in the gather. However, this is just one possible process for generating a stack trace.

In contrast, angle-domain common-image gathers (ADCIGs) are used to analyze the amplitude variation with reflection angle of the seismic traces. Generally, the sampling method for ADCIGs is in the Euclidean coordinate system. As a result, subsurface illumination in the generated seismic image is unevenly distributed in the angle and azimuth directions with respect to the receiver.

The data processing system and processes described in this document provide one or more advantages for performing ADCIGs by sampling in a spiral coordinate space. Sampling for the ADCIGs in a spiral coordinate space (in other words, a spherical coordinate space) can result in generation, by the data processing system, of seismic images including an evenly distributed illumination in subsurface target points. Such sampling improves residual moveout selection for tomography, amplitude versus angle (AVA) analysis, and azimuth-dependent stacking methods for fracture detection.

The data processing system is configured to execute spiral coordinate sampling based on parameters describing how the seismic data is collected, or what the seismic data represents. For example, this can include the number of traces and the maximum angle of incidence. The data processing system generates data representing an intermediate mapping table with index and weighting parameters for each component of the table. The mapping table enables fast searching for angle bins during a migration phase of the gather. Angle bins are generated for adjoint interpolation of the samples of the seismic data to provide the continuous seismic image.

The mapping table decreases the processing time for operations of angle binning from N log N to O(1). For example, if a number of samples N=100, the operation speed is decreased from 200 to 1. The output of this process is an ADCIG sampled under the spherical coordinate space, which the data processing system uses to generate a seismic image of approximately even illumination of the subsurface in the angle and azimuth directions with respect to the receiver.

The data processing system is applicable to subsurface illumination for most any purpose. In some implementations, offshore applications are useful because the wave equation-based migration processes are primarily useful for offshore settings. However, the data processing system can also be used for onshore applications.

Some systems for seismic imaging of a subterranean geological formation include: a parameter definition module configured to receive parameter data representing one or more parameters of a seismic survey used to gather seismic data, the seismic data specifying an incident angle and an azimuth angle for each trace of the seismic survey; a mapping module configured to: determine a relationship between the incident angle and the azimuth angle for each trace and a location in a spiral coordinate system; and generate, based on the one or more parameters and the determined relationship, a weighting function for applying a weight value to each trace seismic data based on the incident angle and the azimuth angle associated with each trace; and a binning module configured to determine a residual moveout value of the seismic data for each location in the spiral coordinate system by applying the weighting function to each trace based on the incident angle and the azimuth angle of the trace; and a rendering module configured to generate a seismic image representing the residual moveout value of the seismic data for each location in the spiral coordinate system.

Some methods for seismic imaging of a subterranean geological formation include: receiving parameter data representing one or more parameters of a seismic survey used to gather seismic data at a parameter definition module, the seismic data specifying an incident angle and an azimuth angle for each trace of the seismic survey; using a mapping module to determine a relationship between the incident angle and the azimuth angle for each trace and a location in a spiral coordinate system, and generate, based on the one or more parameters and the determined relationship, a weighting function for applying a weight value to each trace seismic data based on the incident angle and the azimuth angle associated with each trace; and determining a residual moveout value of the seismic data for each location in the spiral coordinate system by applying the weighting function to each trace based on the incident angle and the azimuth angle of the trace; and generating a seismic image representing the residual moveout value of the seismic data for each location in the spiral coordinate system.

Embodiments of these systems and methods can include one or more of the following features.

In some embodiments, an approximately even distribution of locations of incident angle values and azimuth angle are selected to generate approximately evenly distributed seismic data in spiral coordinates.

In some embodiments, the seismic data comprises results of a five dimensional (5D) angle domain common image gather (ADCIG) at a location of a subterranean geological formation. In some cases, the angle domain common image gather represented in the seismic image is generated in constant computing time regardless of a number of samples in the seismic data.

In some embodiments, the parameters comprise at least one of a number of traces for the seismic survey at a location in a subterranean geological formation and a maximum incident angle of each trace of the seismic survey at the location in the subterranean geological location.

In some embodiments, the seismic image represents an approximately even illumination of a subterranean geological formation in an angle direction and an azimuth direction from a receiver, and wherein the seismic data comprises azimuth-dependent stacking for fracture detection.

In some embodiments, the rendering module is configured to render the seismic image for presentation on a user interface.

The details of one or more embodiments are set forth in the accompanying drawings and the description below.

Other features and advantages will be apparent from the description and drawings, and from the claims.

DETAILED DESCRIPTION

Seismic images can be viewed as photographs for underground layers of rocks. These images can be formed from different probing elastic waves while various images can made from the echoes of these waves that reflect different rock properties. In contrast to a stacked image, pre-stack angle domain common image gathers can provide more subsurface information. For example, a flatness of prestack gathers can provide an indication of the accuracy of the migration velocities. Another application is pre-stack inversion for reservoir properties using Angle Domain Common Image Gathers (ADCIGs).

Traditionally, ADCIGs are sampled under the Euclidean coordinates, in which incidence angle and azimuth angle for each trace relative to the receiver are approximately evenly sampled. However, this sampling method results in an uneven distribution in the spherical coordinate space (also called a spiral coordinate space). For example, near a polar point in the coordinate space, sampling is extremely dense if evenly sampled in the Euclidean space. Near an equator of the spherical coordinate space, sampling is relatively coarse when evenly sampled in the Euclidean space. In addition to the uneven sampling in the spherical coordinate space, Euclidean-based sampling is generally a waste of computational resources for applications in which azimuthal properties of the traces are useful.

The data processing system described below is configured to perform sampling of the seismic data in the spherical coordinate space for performing an ADCIG. A mapping table is generated that is configured for the particular seismic data being sampled to reduce computation time of the sampling process and result in an approximately even distribution of samples in the spherical coordinate space. Generally, by sampling in a Euclidean coordinate space without application of the mapping table by the data processing system, approximately at least 4 times more sampling (memory cost) is needed. This is relative to generating, by the data processing system, a similar seismic image as another seismic image generated from seismic data sampled in the spherical coordinate system using the mapping table.

This document describes a data processing system 200 for generating the ADCIGs which are sampled under the spiral coordinates. Under the spiral coordinate sampling, the illumination for the seismic image is approximately evenly distributed.

Figure 1:
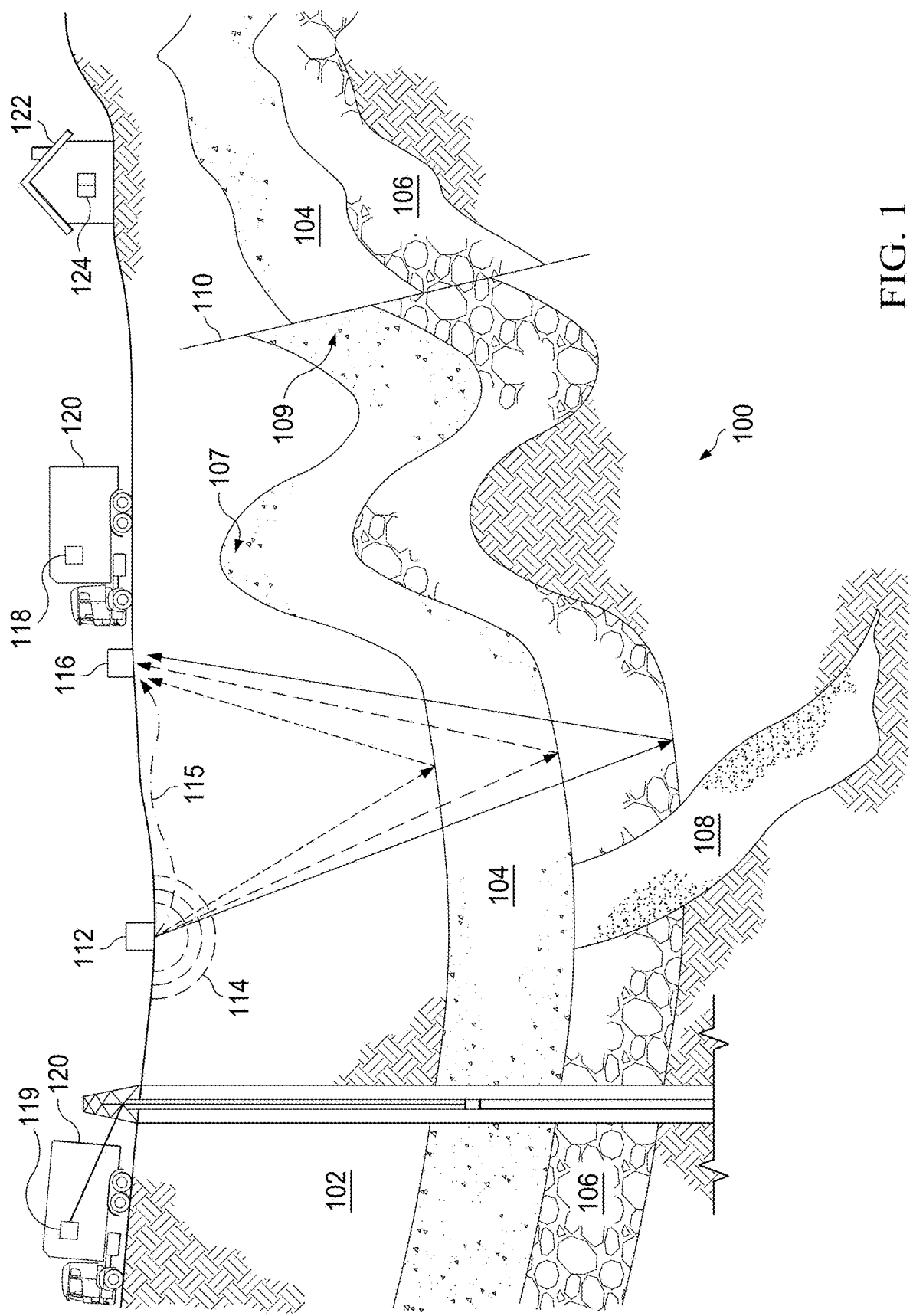
FIG. 1 is a schematic view of a seismic survey being performed to map subterranean features such as facies and faults.

FIG. 1 is a schematic view of a seismic survey being performed to map subterranean features such as facies and faults in a subterranean formation 100. The seismic survey can be conducted for seismic imaging of a subterranean geological formation using ADCIGs. The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface.

The velocity of these seismic waves depends on properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing the subterranean formation 100. The seismic cube can also display results of the analysis of the seismic data associated with the seismic survey.

Figure 2:
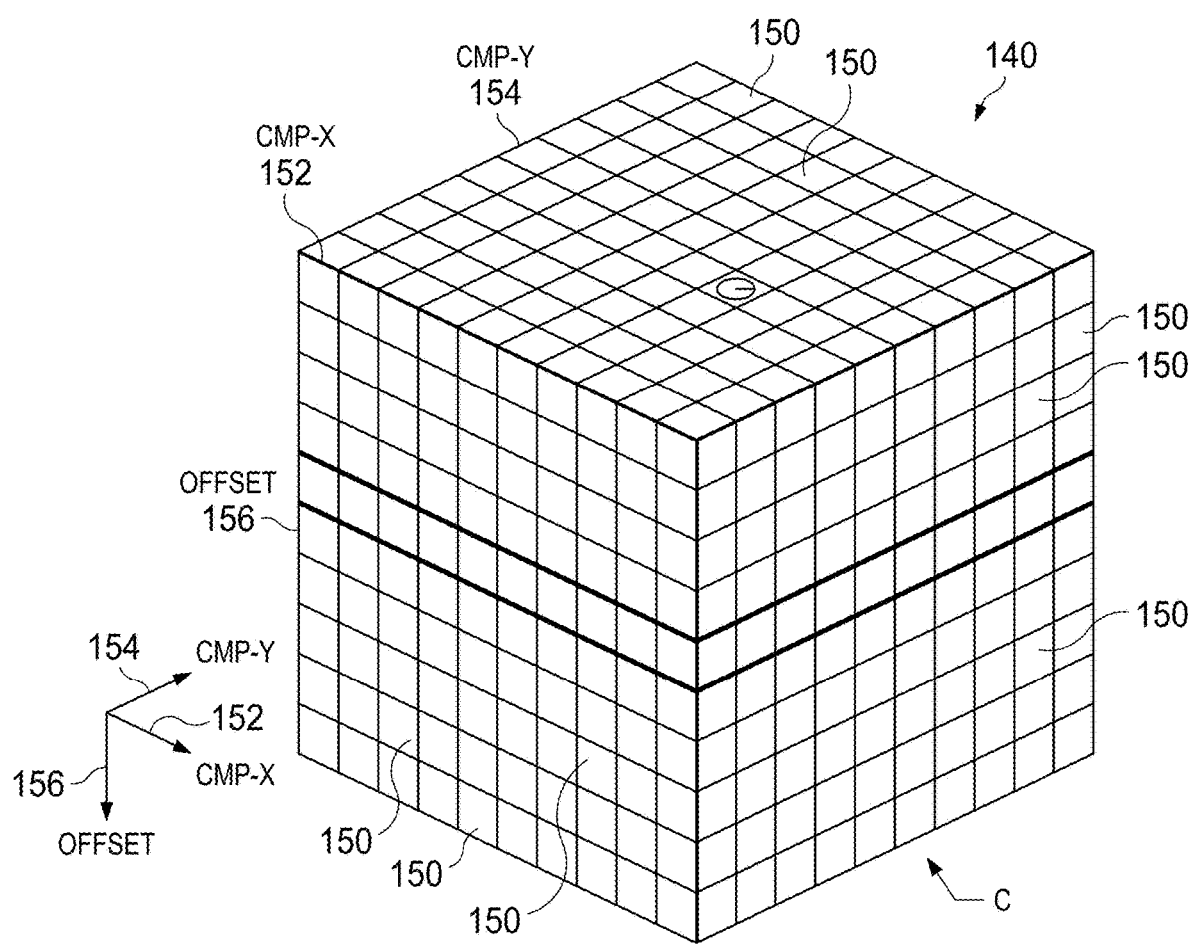
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and an offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

The seismic cube 140 represents a Euclidean coordinate space. As further described below in relation to FIGS. 5-11, the Euclidean coordinate space is mapped to a spherical coordinate space using a mapping table. The mapping table is generated based on parameters of the seismic survey described in relation to FIG. 1.

Figure 3:
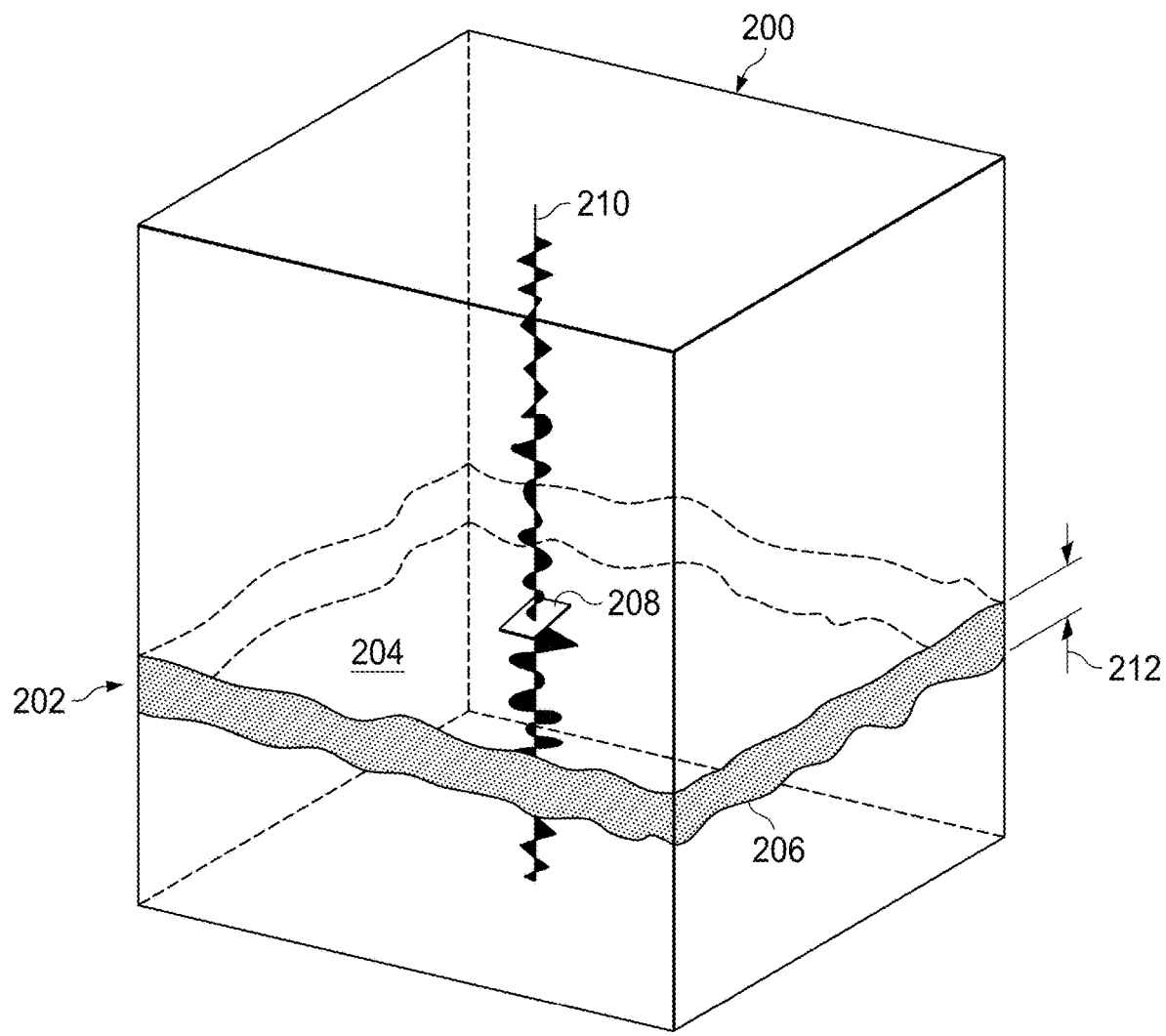
FIG. 3 illustrates a stratigraphic trace within the three-dimensional cube of FIG. 2.

FIG. 3 illustrates a seismic cube 200 representing a formation. The seismic cube has a stratum 202 based on a surface (for example, an amplitude surface 204) and a stratigraphic horizon 206. The amplitude surface 204 and the stratigraphic horizon 206 are grids that include many cells such as exemplary cell 208. Each cell is a sample of a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4C:
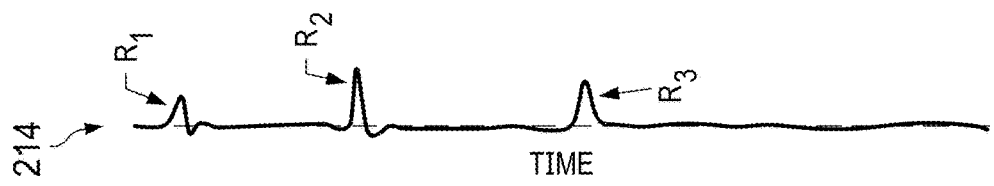
FIGS. 4A, 4B, and 4C schematically illustrate the process stacking a group of seismic traces to improve the signal to noise ratio of the traces.
Figure 4B:
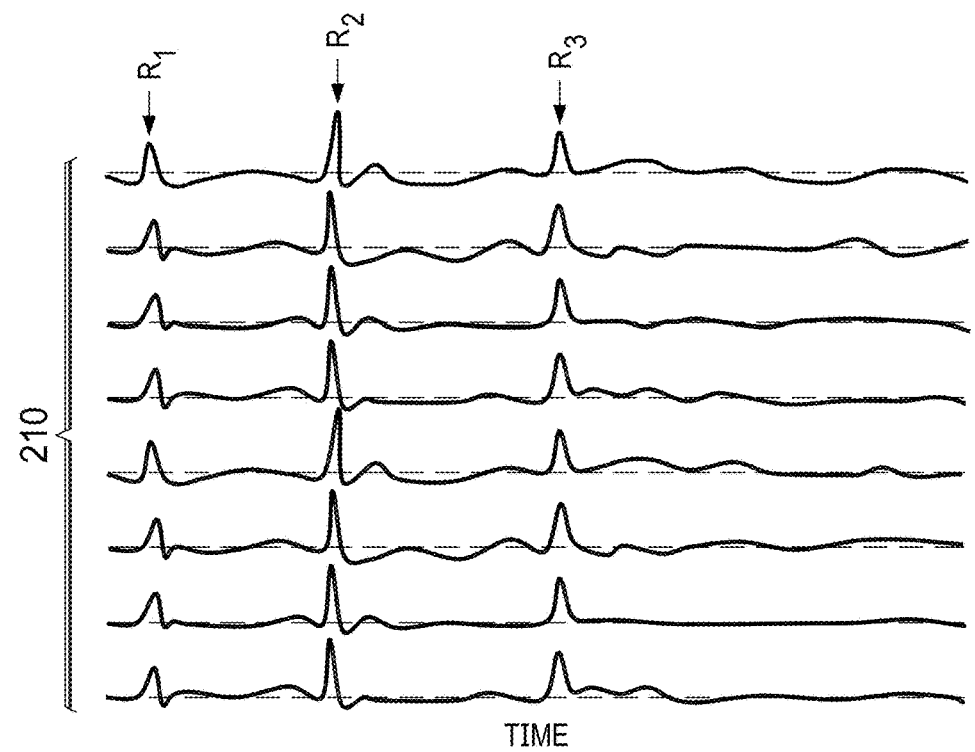
Figure 4A:
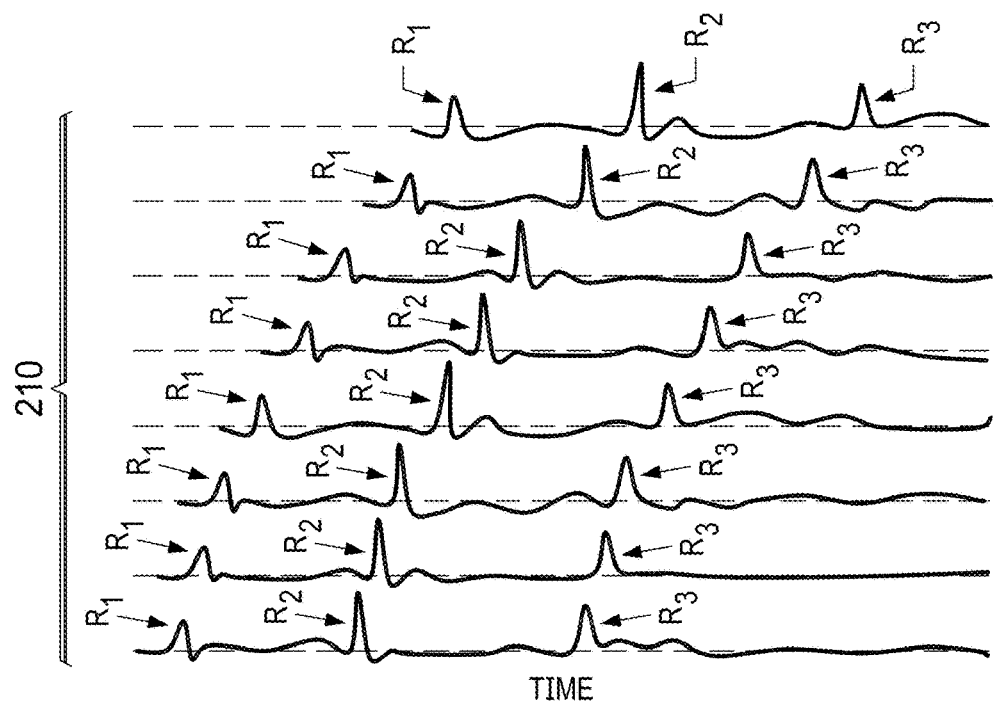

FIGS. 4A, 4B, and 4C schematically illustrate the process stacking a group of seismic traces 210 to improve the signal to noise ratio of the traces. FIG. 4A illustrates a common midpoint (CMP) gather of eight traces 210 generated by a set of sources and sensors that share a common midpoint. For ease of explanation, the traces are assumed to have been generated by reflections from three horizontal horizons.

The traces 210 are arranged with increasing offset from the CMP. The offset of the traces 210 from the CMP increase from left to right and the reflection time increases from top to bottom. Increasing offset from the common midpoint increases the angle of a seismic wave that between a source and a sensor, increases the distance the wave travels between the source and the sensor, and increases the slant reflection time. The increasing time for the reflections ($R_1$, $R_2$, and $R_3$) from each of the horizons to arrive for source-sensor pairs with increasing offsets from the CMP reflects this increased slant time.

FIG. 4B shows the traces 210 after normal moveout (NMO) correction. NMO is the difference between vertical reflection time and the slant reflection time for a given source-sensor pair. This correction places reflections ($R_1$, $R_2$, and $R_3$) from common horizons at the same arrival time. The NMO correction is a function of the vertical reflection time for a specific horizon, the offset of a specific source-sensor pair, and the velocity of the seismic wave in the subterranean formation. The vertical reflection time for a specific horizon and the offset for a specific source-sensor pair are known parameters for each trace. However, the velocity is usually not readily available. As previously discussed, the velocity of seismic waves depends on properties, for example, density, porosity, and fluid content of the medium through which the seismic waves are traveling and consequently varies with location in the subterranean formation being studied.

FIG. 4C shows a stack trace 214 generated by summing the traces 210 of the CMP gather and dividing the resulting amplitudes by the number of traces in the gather. The number of traces in the gather is also referred to as the fold of the gather. The noise tends to cancel out and the reflections ($R_1$, $R_2$, and $R_3$) from the horizons of the subterranean formation are enhanced.

Alternative to the CMP gather using NMO correction of FIGS. 5A-5C, the angle-domain common-image gathers (ADCIGs) are used to analyze the amplitude variation with reflection angle of the seismic traces. For example, ADCIGs are useful at least in applications such as tomography, amplitude versus angle (AVA) analysis, and azimuth-dependent stacking methods for fracture detection.

Figure 5:
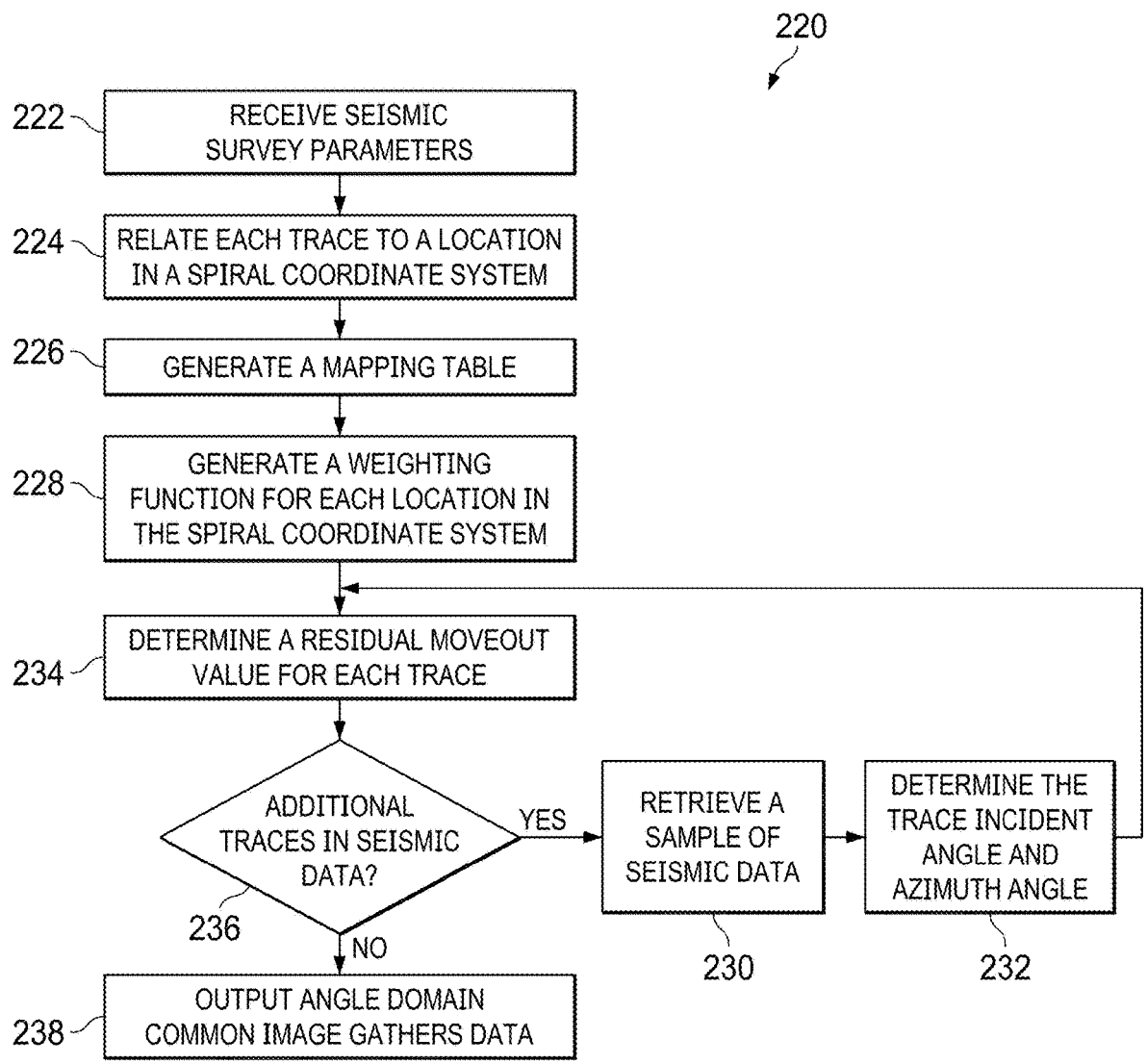
FIG. 5 shows a process for performing sampling for the ADCIGs in a spiral coordinate space.
Figure 6:
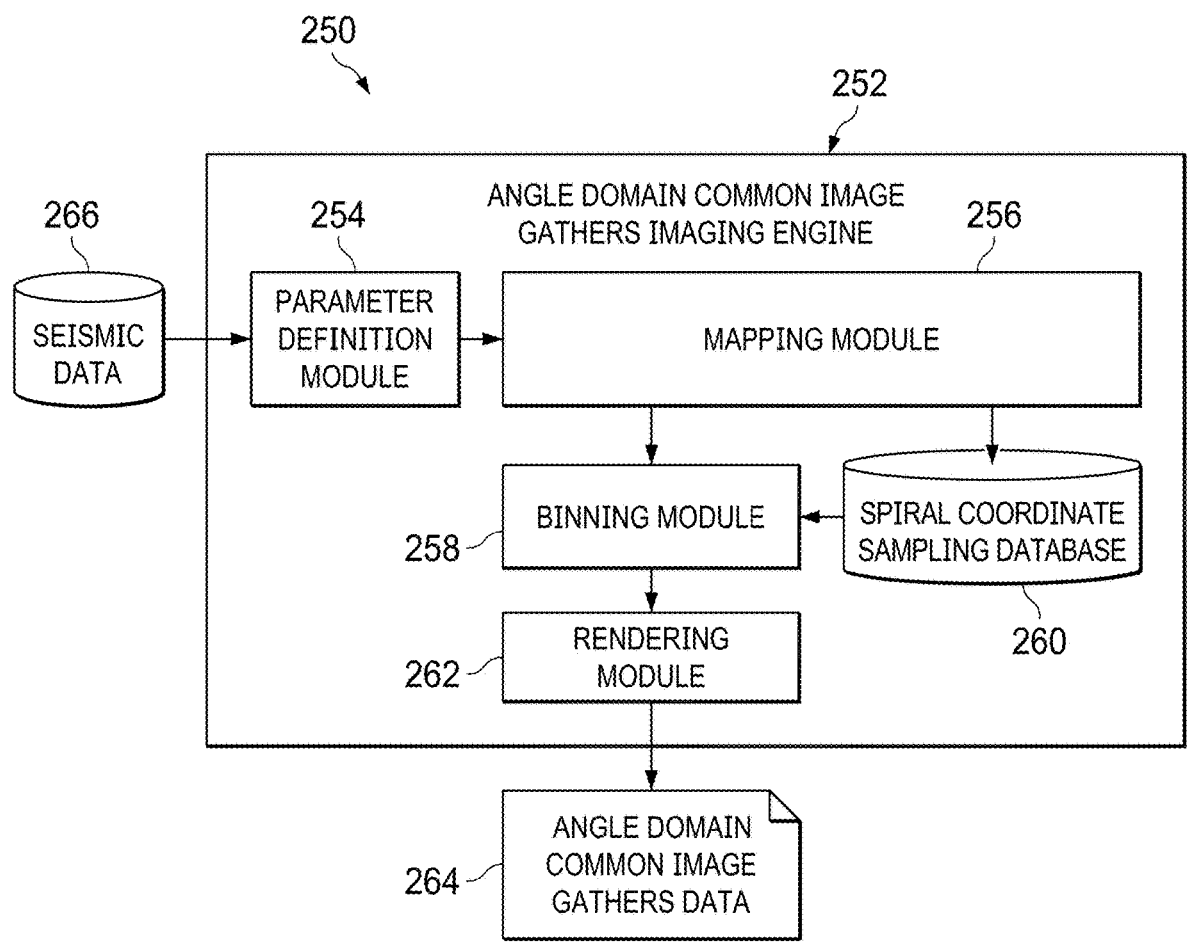
FIG. 6 shows a data processing system for generating an ADCIG sampled in a spiral coordinate space.

Turning to FIGS. 5-6, a data processing system 250 and process 220 described in relation to FIGS. 5-6 provide one or more advantages for performing ADCIGs by sampling in a spiral coordinate space. Sampling for the ADCIGs in a spiral coordinate space (in other words, a spherical coordinate space) can result in generation, by the data processing system, of seismic images including an evenly distributed illumination in subsurface target points. Such sampling improves residual moveout selection for various applications of seismic imaging.

FIG. 5 shows a process 220 for performing sampling for the ADCIGs in a spiral coordinate space. In some implementations, the process 220 can be performed by the data processing system 250 of FIG. 6. The data processing system 250 includes an ADCIG imaging engine 252. The ADCIG imaging engine 252 is configured to perform the steps for sampling for the ADCIGs in a spiral coordinate space. The ADCIG imaging engine 252 receives (222) seismic survey parameters that described how a seismic survey is performed. For example, the parameters can include an angle of incidence for traces and a number of traces being received in the seismic data 266. In some implementations, the values of the parameters can be selected or defined at a parameter definition module 254 of the ADCIG imaging engine 252. The parameter definition module 254 sends the parameter values to a mapping module 256 for generation of an intermediate mapping table, such as table 322 of FIG. 8.

The mapping module 256 is configured to relate (224), for each trace specified in the parameter data, an incident angle and an azimuth for the respective trace of the seismic survey to a location in the spherical coordinate space. In other words, the mapping module 256 determines a relationship between the incident angle and the azimuth angle for each trace and a location in a spiral coordinate system. The mapping module 256 generates (226) a mapping table. The mapping module 256 generates the mapping table based on the one or more parameters and the determined relationship. The mapping table includes a weighting function for applying a weight value to each trace seismic data based on the incident angle and the azimuth angle associated with each trace. The weighting function value for each indexed trace is stored in a spiral coordinate sampling database 260. The database 260 can store the data as a table such as a lookup table for later reference by the binning module 258 during angle binning and interpolation.

The mapping module 256 sends the mapping table to a binning module 258 of the ADCIG imaging engine 252. The binning module 258 is configured to determine (234) a residual moveout value of the seismic data for each location in the spiral coordinate system by applying the weighting function to each trace based on the incident angle and the azimuth angle of the trace of the seismic data 266. The binning module 258 applies an interpolation function (such as a linear interpolation function) to obtain the approximate value for the trace at the precise location in the spherical coordinate space. The seismic data 266 is retrieved (230) by the ADCIG imaging engine 252 after the seismic survey has been performed. The data processing system 250 determines (232) the trace incident angle and the azimuth angle for each trace for determining the residual moveout value for that trace.

The ADCIG imaging engine 252 checks to determine (236) whether any additional traces are present in the seismic data 266. If additional traces are present, the ADCIG imaging engine 252 determines a residual moveout value for the remaining traces. If no additional traces are present, the ADCIG imaging engine 252, by a rendering module 262, outputs ADCIG data 264 representing the ADCIG for the seismic data 266. The ADCIG can be used by the rendering engine 262 to generate a seismic image of the subterranean formation.

Figure 7B:
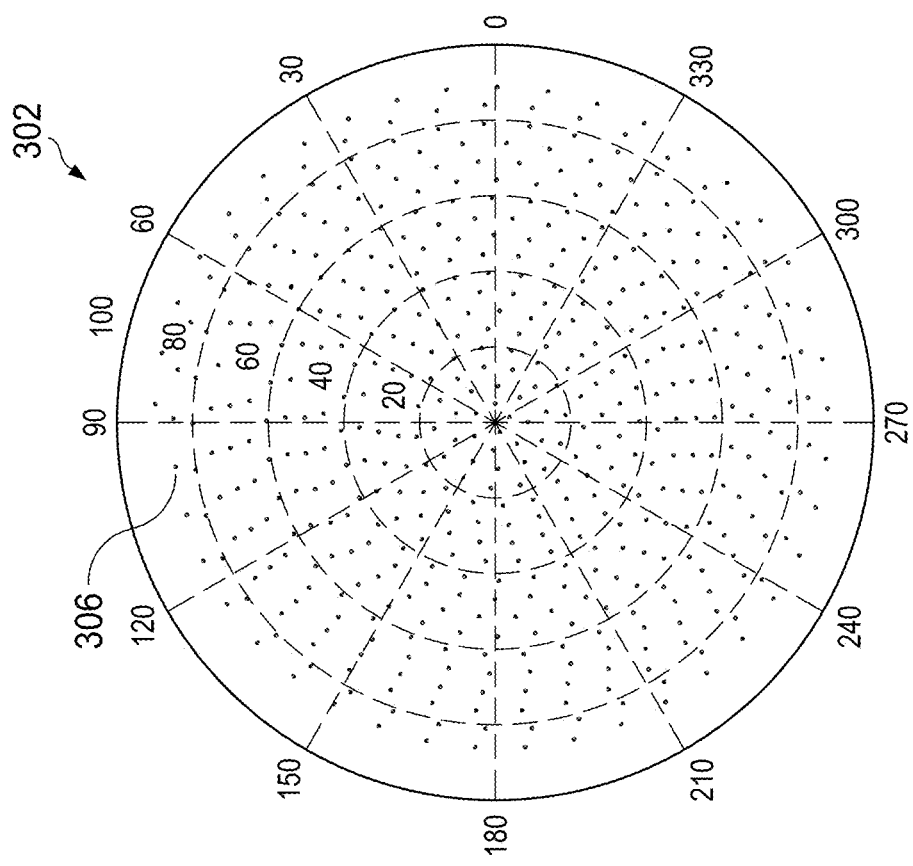
FIGS. 7A-7B show illustrations of coordinate spaces.
Figure 7A:
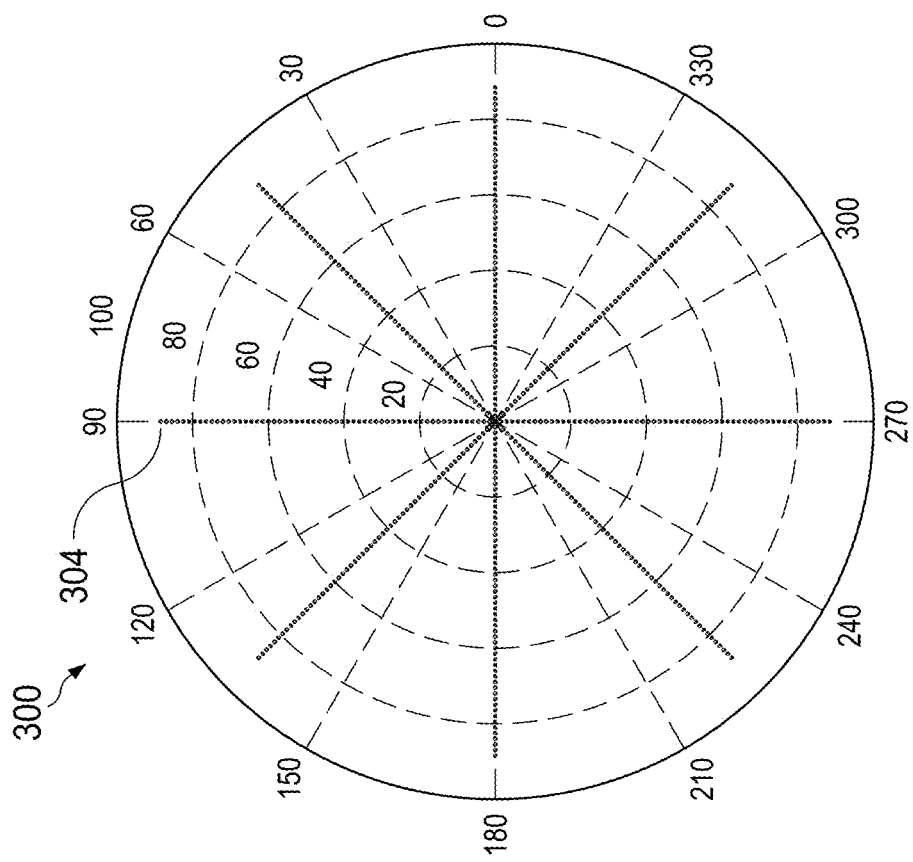

FIG. 7A shows an example of a spherical coordinate space 300 in which sampling is performed using a Euclidean space. The sample data 304 is coarse near the equator of the spherical coordinate space 300. Samples are restricted to particular azimuth angle values. Sampling is overrepresented near the polar point of the spherical space 300.

FIG. 7B shows an example of a spherical coordinate space 302 in which sampling is performed in the spherical coordinate space. The sample data 306 is approximately evenly. This benefits applications in which azimuthal properties of the traces are useful because rich azimuthal data are acquired. The sampling appears bunched in Euclidean space. When traces are received, areas between the mapped sample locations 306 can be interpolated from the sampled locations to obtain precise velocity values at those points.

For performing sampling of the seismic data in the spherical coordinate space for performing an ADCIG, the data processing system 250 generates a spiral coordinate sampling database. The data processing system 250 refers to the generated database during generation of the mapping table, which in turn is referenced during sampling. In the following equations, θ (in degrees) is the incident angle and φ (in radians) is the azimuth value. Additionally, $\theta_{max}$ is the maximum incident angle, and N is number of traces in the ADCIG for one image location. The values of $\theta_{max}$ and N are parameters of the seismic survey. These parameters are user defined because they depend on how the seismic survey is performed. These parameters are used for generating the mapping table that relates the physical seismic cube (such as cube 200 of FIG. 2) in which the seismic data are recorded to the spherical coordinate space for performing the sampling. The mapping table is described in detail in relation to FIG. 8. Last, a value of C is a constant value defined as the ratio of average weft length and warp length. Weft refers to a length along the horizontal (latitude) direction with respect to the receiver of the seismic survey. Warp refers to a length along the vertical (meridian) direction in the spherical surface with respect to the receiver of the seismic survey. The ratio value of C is determined for each cell in the sphere surface and it is used to decide the parameter $n_{circle}$, which is number of circles in the spiral coordinate space. The value of d is a value of the dip of the spiral coordinate space, ΔS is the area of each tile in the sphere surface.

Equation 1 shows a relationship between the number of circles $n_{circle}$ of the spherical coordinate space and the values of $\theta_{max}$, N, and C, which is a geometrical relationship:

$$n_{circle} = \sqrt{\frac{\theta_{max} \cdot N \cdot C}{360}} \quad (1)$$

The dip value d and the area ΔS of each tile in the sphere surface are also geometric properties, shown in Equations (2) and (3):

$$d = \frac{\theta_{max}}{n_{circle}} \quad (2)$$

$$\Delta S = \frac{2\pi\left(1 - \cos\left(\frac{\left(\theta_{max} + \frac{d}{2}\right)\pi}{180}\right)\right)}{N} \quad (3)$$

For generation of the spiral coordinate sampling database by the data processing system 250, each position in the spherical coordinate space is mapped to a location in the seismic cube 200. This is a geometric relationship. Equations 4, 5, and 6 show the relationship between each azimuth value and angle value. The value of i is an index which can be increased or decreased depending on the number of samples that the data processing system 250 uses to generate the seismic image.

$$\theta_1 = 0, \varphi_1 = 0 \quad (4)$$

$$\theta_{i+1} = \frac{180}{\pi}\left(\cos^{-1}\left(1 - \frac{(i+1)\Delta S}{2\pi}\right) - \frac{d\pi}{360}\right) \quad (5)$$

$$\varphi_{i+1} = \frac{2\pi}{d}\theta_{i+1} \quad (6)$$

When generating the spiral coordinate ADCIGs, the data processing system 250 is configured to search for the nearest point in the previous generated spiral coordinate sampling database for each angle and azimuth pairs $(\theta_i, \varphi_i)$. This is a log N problem where N is the number of samplings in the database. The data processing system 250 applies an interpolation technique for generation of angle binnings. Generally, the data processing system 250 is configured to apply adjoint interpolation for angle binnings. Other linear interpolation methods can be used. Generally, more than one point is searched by the data processing system 250, and the interpolation process faces an issue of fast sorting computation time. The sorting process uses N log N operations for each angle and azimuth pair $(\theta_i, \varphi_i)$. Generally, the dimension degree of the angle and azimuth pairs is four dimensional (4D), and so searching becomes relatively computationally expensive as samples are added.

Figure 8:
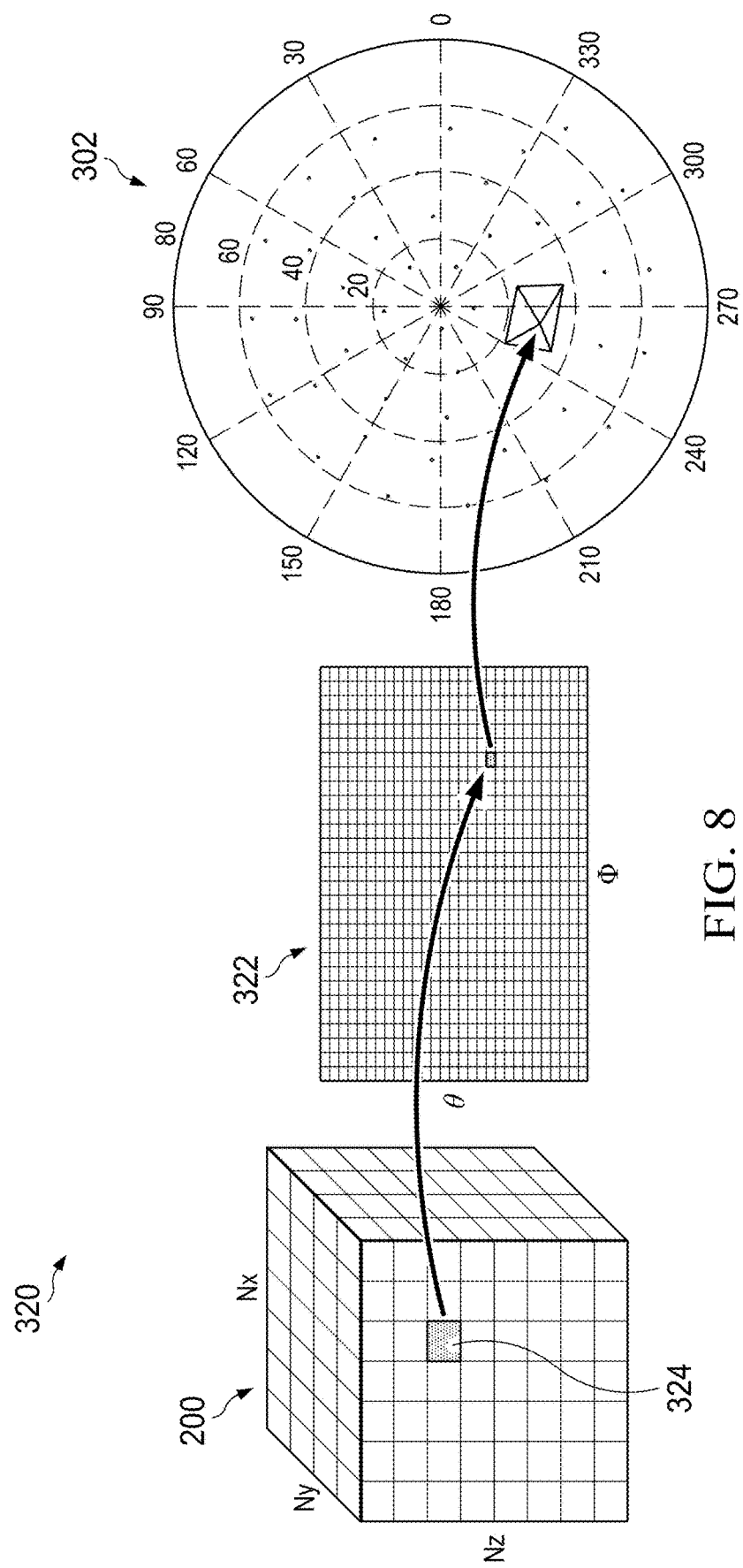
FIG. 8 shows an example process for generating a mapping table.
Figure 9:
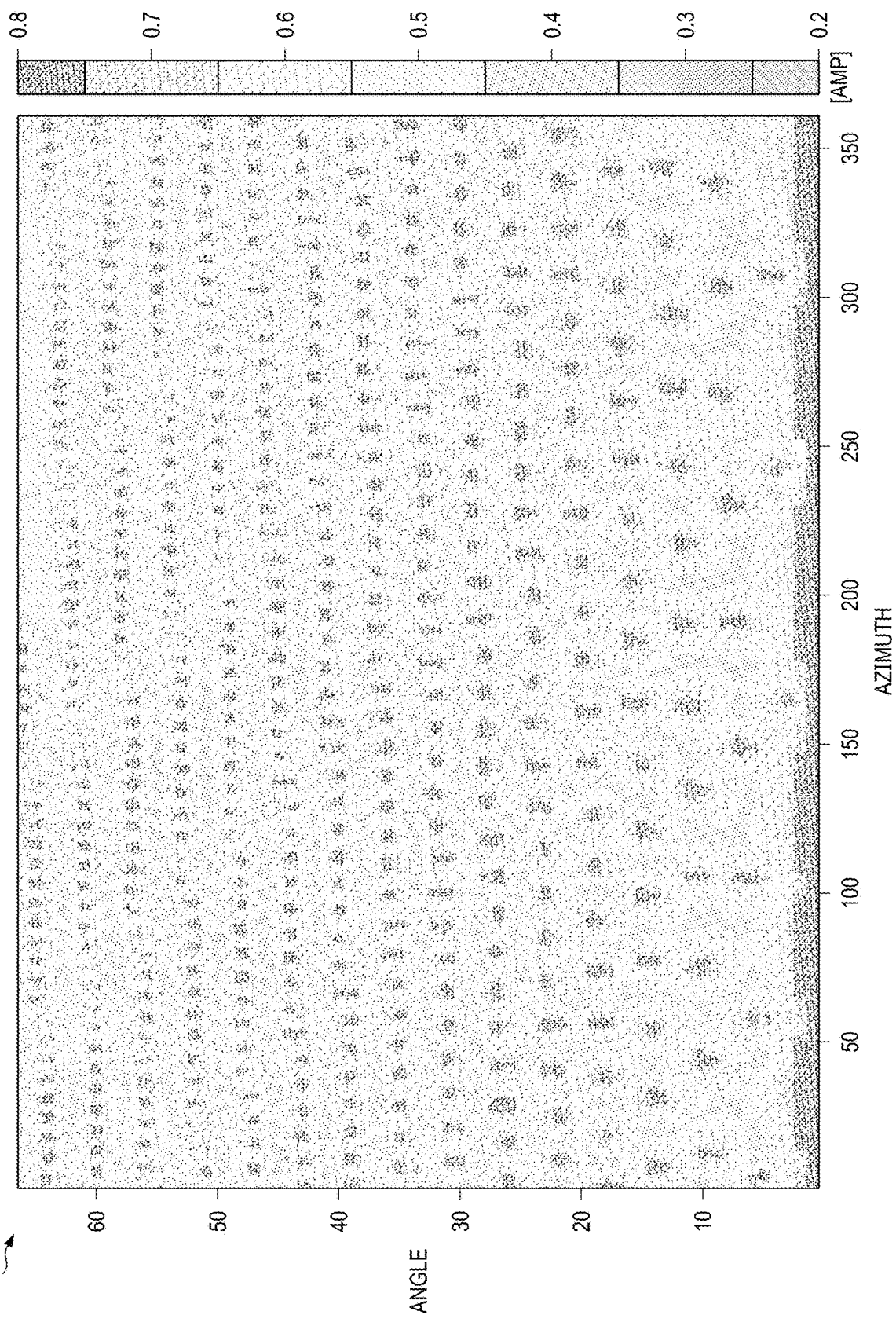
FIG. 9 shows an illustration of a graph of weight values.

To solve this issue, the data processing system 250 generates a two dimensional (2D) intermediate mapping table, as shown in FIG. 8. Turning to FIG. 8, a process 320 is shown for generating the mapping table 322 to relate the seismic cube 200 to the spherical coordinate space 302. A weighting function is generated for relating each element of the 2D mapping table to the spherical coordinate space 302. The weighting function is generated as follows. For each element (index) in the 2D table, azimuth values and angle values are known based on equation (6). The data processing system 250 determines the distance between this point and the sampling points 306 in the spiral coordinate space 302. The data processing system 250 sorts these values to create the weighting function for each index value of the mapping table 322. In some implementations, the weighting functions are calculated as the inverse value of the distance to the simplest case for the sampling data. For example, the weighting parameters for the nearest point for each index in the 2D mapping table 322 is shown in FIG. 9, described below. The data processing system 250, by using the mapping table 322, reduces the operations for angle binning from N log N to O(1), where N is the number of samples.

For generating the mapping table 322, a position 324 in the seismic cube 200 is selected. The position 324 can be any position of the seismic cube 200. For a complete mapping table 322, all regions of the seismic cube 200 are mapped. The resolution is a selectable parameter and refers to the area for each positon 324 and the number of indices i represented in the mapping table 322. The mapping table 322 includes a value for each azimuth and angle pair $(\theta_i, \varphi_i)$. When analyzing the seismic data for generating a seismic image, the size of the angle bins (described below) depends on the resolution of the mapping table. Each index of the mapping table can refer to a region of sub-degree value and sub-radian value for $(\theta_i, \varphi_i)$, respectively. The resolution can be increased up to maximum size in which there is a single region defined.

FIG. 9 shows a graph 900 illustrating a weight value (shown as [Amp] or amplitude) for each value of $(\theta_i, \varphi_i)$. The weight values in this particular function range between 0.2 and 0.8, but other ranges for the weights are possible, such as 0-1.00. The weight for an index can be stored in a data structure (for example, a lookup table) that the data processing system 250 can reference when performing a gather for generating a seismic image.

Once the mapping table 322 is generated, the data processing system 250 can perform angle binning for ADCIGs. The data processing system 250 is configured to perform a reverse time migration (RTM) for a common shot gather. The data processing system 250 is configured to determine the angle and azimuth pairs ($\theta_i$, $\varphi_i$) for each imaging location at each imaging time. After determining the values for each of the angle pairs, the data processing system 250 searches for the nearest point for each value by referencing the mapping table 322. The data processing system 250 applies an interpolation function to estimate the value at the exact position of interest. In some implementations, adjoint interpolation is performed by the data processing system 250 using the index and weighting functions for angle binning. In some implementations, other linear interpolation methods can also be applied. In some implementations, the data processing system 250 determines the weighting functions based on adjoint linear interpolation and thus uses adjoint linear interpolation at the binning stage. In some implementations, the data processing system 250 uses an azimuth range of 0-360 degrees and differentiates reciprocity shot and receiver pairs in the finial spiral coordinate ADCIG.

Figure 10A:
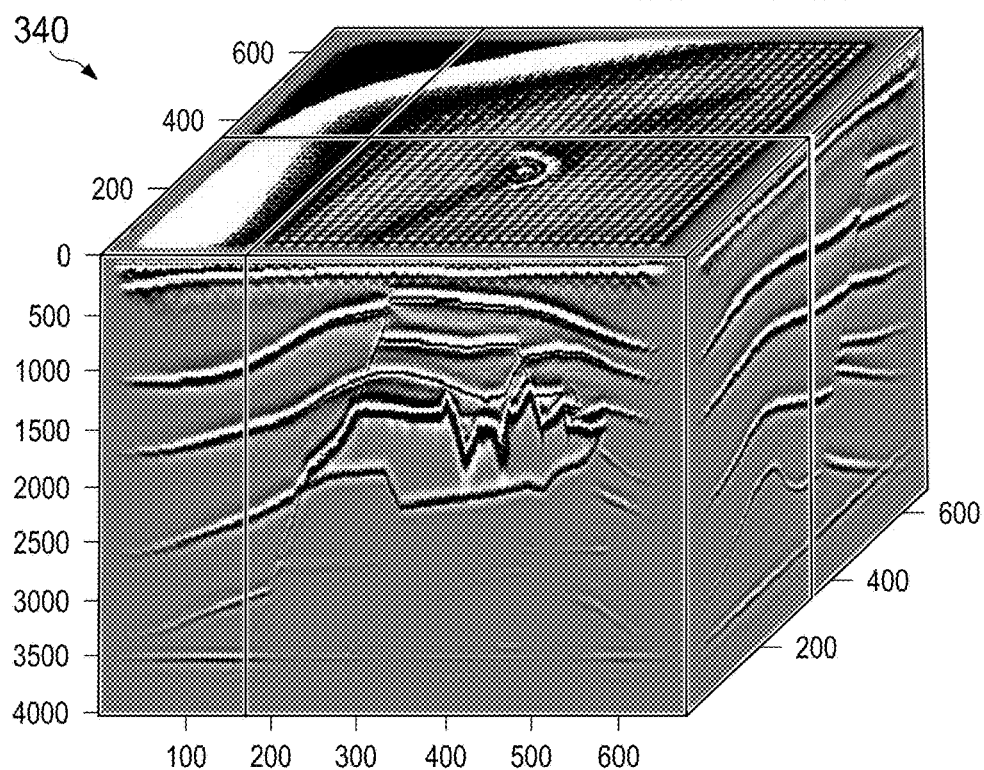
FIGS. 10A-10B show examples of seismic images.
Figure 10B:
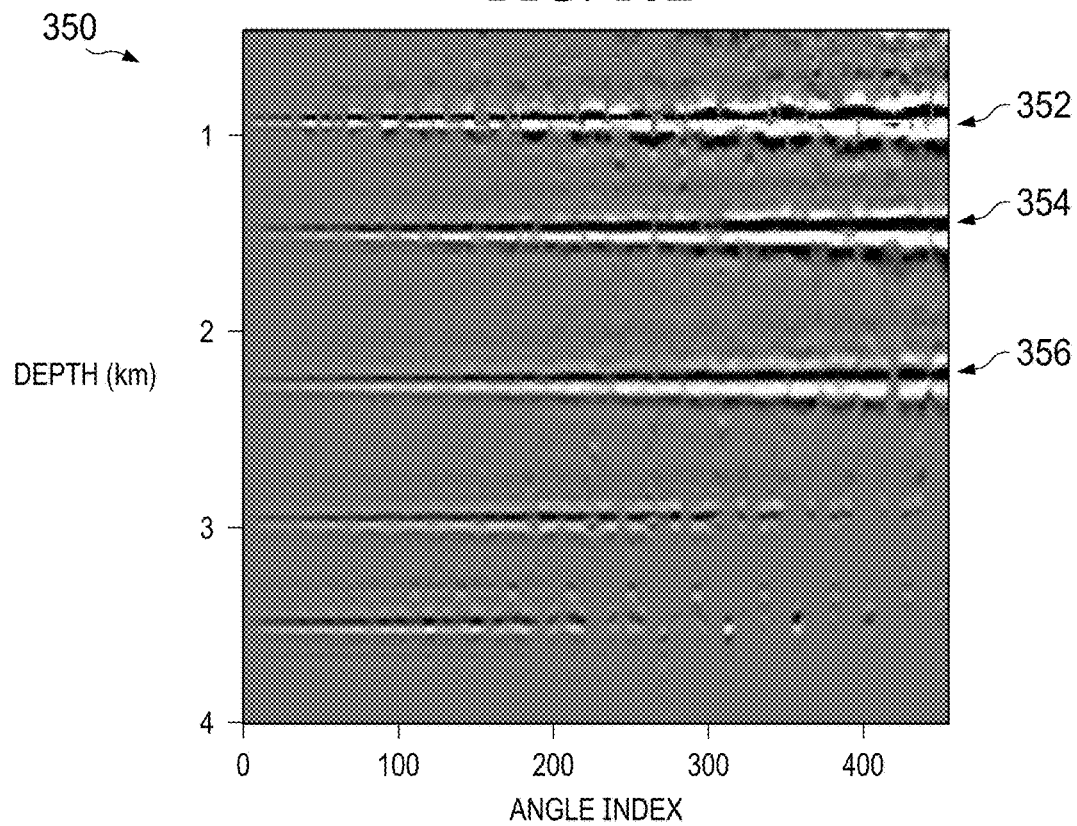

FIGS. 10A-10B show outputs 340 and 350, respectively, illustrating a three dimensional (3D) RTM example. Output 340 includes the stacked seismic image. Output 350 shows the spiral coordinate space ADCIG output. The seismic events such as event 352, event 354, and event 356 are flat in the ADCIG output 350 because the data processing system 250 has applied an accurate velocity value. As previously stated, these results can be achieved faster than using the Euclidean coordinate space by approximately a factor of four. The data processing system 250 uses these gathers for improving residual moveout picking for tomography, amplitude versus angle (AVA) analysis, and also for azimuth dependent stacking for fracture detection.

Figure 11:
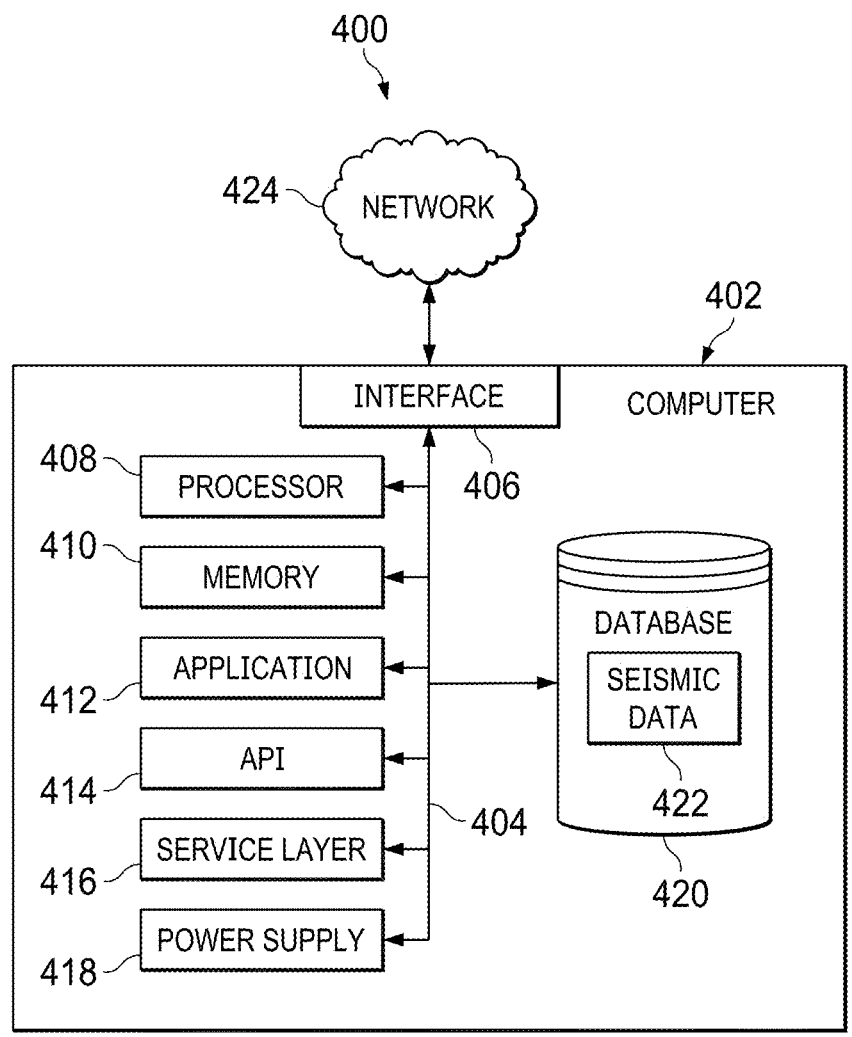
FIG. 11 is a diagram of an example computing system.

FIG. 11 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402. The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 11, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 11, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 11, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 11, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or non-rechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A system for seismic imaging of a subterranean geological formation, the system comprising:
   a parameter definition module configured to receive parameter data representing one or more parameters of a seismic survey used to gather seismic data, the seismic data specifying an incident angle and an azimuth angle for each trace of the seismic survey;
   a mapping module configured to:
      determine a relationship between the incident angle and the azimuth angle for each trace and a sampling location in a spiral coordinate system; and
      generate, based on the one or more parameters and the determined relationship, a weighting function for applying a weight value to each trace seismic data based on the incident angle and the azimuth angle associated with each trace, the weighting value based on a distance between the location of each trace and a corresponding sampling location;
   a binning module configured to determine a residual moveout value of the seismic data for each sampled location in the spiral coordinate system by applying the weighting function to each trace based on the distance between incident angle and the azimuth angle of the trace and the corresponding sampling location; and
   a rendering module configured to generate a seismic image representing the residual moveout value of the seismic data for each location in the spiral coordinate system, wherein the seismic image represents an approximately even illumination of a subterranean geological formation in an angle direction and an azimuth direction from a receiver.

2. The system for seismic imaging of claim 1, wherein an approximately even distribution of locations of incident angle values and azimuth angle are selected to generate approximately evenly distributed seismic data in spiral coordinates.

3. The system for seismic imaging of claim 1, wherein the seismic data comprises results of a five dimensional (5D) angle domain common image gather (ADCIG) at a location of a subterranean geological formation.

4. The system for seismic imaging of claim 3, wherein the angle domain common image gather represented in the seismic image is generated in constant computing time regardless of a number of samples in the seismic data.

5. The system for seismic imaging of claim 1, wherein the parameters comprise at least one of a number of traces for the seismic survey at a location in a subterranean geological formation and a maximum incident angle of each trace of the seismic survey at the location in the subterranean geological location.

6. The system for seismic imaging of claim 1, wherein the seismic data comprises azimuth-dependent stacking for fracture detection.

7. The system for seismic imaging of claim 1, wherein the rendering module is configured to render the seismic image for presentation on a user interface.

8. A method for seismic imaging of a subterranean geological formation, the method comprising:

receiving parameter data representing one or more parameters of a seismic survey used to gather seismic data, the seismic data specifying an incident angle and an azimuth angle for each trace of the seismic survey;

determining a relationship between the incident angle and the azimuth angle for each trace and a sampling location in a spiral coordinate system;

generating, based on the one or more parameters and the determined relationship, a weighting function for applying a weight value to each trace seismic data based on the incident angle and the azimuth angle associated with each trace, the weighting value based on a distance between the location of each trace and a corresponding sampling location;

determining a residual moveout value of the seismic data for each sampled location in the spiral coordinate system by applying the weighting function to each trace based on the distance difference between incident angle and the azimuth angle of the trace and the corresponding sampling location; and generating a seismic image representing the residual moveout value of the seismic data for each location in the spiral coordinate system, wherein the seismic image represents an approximately even illumination of a subterranean geological formation in an angle direction and an azimuth direction from a receiver.

9. The method of claim 8, wherein an approximately even distribution of locations of incident angle values and azimuth angle are selected to generate approximately evenly distributed seismic data in spiral coordinates.

10. The method of claim 8, wherein the seismic data comprises results of a five dimensional (5D) angle domain common image gather (ADCIG) at a location of a subterranean geological formation.

11. The method of claim 10, wherein the angle domain common image gather represented in the seismic image is generated in constant computing time regardless of a number of samples in the seismic data.

12. The method of claim 8, wherein the parameters comprise at least one of a number of traces for the seismic survey at a location in a subterranean geological formation and a maximum incident angle of each trace of the seismic survey at the location in the subterranean geological location.

13. The method of claim 8, wherein the seismic data comprises azimuth-dependent stacking for fracture detection.

14. The method of claim 8, wherein the rendering module is configured to render the seismic image for presentation on a user interface.

15. One or more non-transitory computer readable media storing instructions configured, when executed by one or more processors, to cause the one or more processors to perform operations comprising:

receiving parameter data representing one or more parameters of a seismic survey used to gather seismic data, the seismic data specifying an incident angle and an azimuth angle for each trace of the seismic survey;

determining a relationship between the incident angle and the azimuth angle for each trace and a sampling location in a spiral coordinate system;

generating, based on the one or more parameters and the determined relationship, a weighting function for applying a weight value to each trace seismic data based on the incident angle and the azimuth angle associated with each trace, the weighting value based on a between the location of each trace and a corresponding sampling location;

determining a residual moveout value of the seismic data for each sampled location in the spiral coordinate system by applying the weighting function to each trace based on the distance between incident angle and the azimuth angle of the trace and the corresponding sampling location; and generating a seismic image representing the residual moveout value of the seismic data for each location in the spiral coordinate system, wherein the seismic image represents an approximately even illumination of a subterranean geological formation in an angle direction and an azimuth direction from a receiver.

16. The method of claim 15, wherein an approximately even distribution of locations of incident angle values and azimuth angle are selected to generate approximately evenly distributed seismic data in spiral coordinates.

17. The method of claim 15, wherein the seismic data comprises results of a five dimensional (5D) angle domain common image gather (ADCIG) at a location of a subterranean geological formation.

18. The method of claim 17, wherein the angle domain common image gather represented in the seismic image is generated in constant computing time regardless of a number of samples in the seismic data.

19. The method of claim 15, wherein the parameters comprise at least one of a number of traces for the seismic survey at a location in a subterranean geological formation and a maximum incident angle of each trace of the seismic survey at the location in the subterranean geological location.

20. The method of claim 15, wherein the seismic data comprises azimuth-dependent stacking for fracture detection.

* * * * *